United States Patent
Henderson

[11] Patent Number: 5,868,808
[45] Date of Patent: Feb. 9, 1999

[54] VELOCITY STACK FILTER

[76] Inventor: Michael J. Henderson, 106-A Broadway St., Pembroke, N.H. 03275

[21] Appl. No.: 907,286

[22] Filed: Aug. 6, 1997

[51] Int. Cl.⁶ .............................. B01D 46/24; F02M 9/06
[52] U.S. Cl. ............................ 55/336; 55/385.6; 55/491; 55/DIG. 28; 123/198 E
[58] Field of Search .................................. 55/336, 385.3, 55/DIG. 28, 491; 123/198 E

[56] References Cited

U.S. PATENT DOCUMENTS

| | | |
|---|---|---|
| D. 305,149 | 12/1989 | Stahel . |
| 1,367,623 | 2/1921 | Morgan . |
| 1,375,422 | 4/1921 | Sherer . |
| 1,828,816 | 10/1931 | Pierson . |
| 2,024,665 | 12/1935 | Snell . |
| 2,761,529 | 9/1956 | Wisenbaugh ............................ 55/385.3 |
| 3,108,866 | 10/1963 | Saunders .................................... 55/491 |
| 3,709,469 | 1/1973 | Edmonston et al. . |
| 4,065,276 | 12/1977 | Nakaya et al. . |
| 4,066,720 | 1/1978 | Carter . |
| 4,412,596 | 11/1983 | Pudil et al. ............................. 55/385.3 |
| 4,425,977 | 1/1984 | Michiuchi ............................... 55/385.3 |
| 4,438,828 | 3/1984 | Nakagawa ............................... 55/385.3 |
| 4,484,651 | 11/1984 | Hattori et al. .......................... 55/385.3 |
| 4,514,201 | 4/1985 | Brown .................................... 55/385.3 |
| 4,523,937 | 6/1985 | Brubaker .................................... 55/491 |
| 4,592,316 | 6/1986 | Shiratsuchi et al. .................... 55/385.3 |
| 5,318,608 | 6/1994 | Boone .................................... 55/385.3 |
| 5,400,753 | 3/1995 | Andress et al. ........................ 55/385.3 |

FOREIGN PATENT DOCUMENTS

| | | |
|---|---|---|
| 2488656 | 2/1982 | France . |
| 0156245 | 12/1980 | Japan ..................................... 55/385.3 |
| 0025868 | 6/1987 | Japan ..................................... 55/385.3 |
| 649872 | 2/1979 | U.S.S.R. . |
| 806889 | 2/1981 | U.S.S.R. . |
| 1592556 | 9/1990 | U.S.S.R. . |
| 1746031 | 7/1992 | U.S.S.R. . |
| 273529 | 7/1927 | United Kingdom . |
| 2159434 | 12/1985 | United Kingdom .................. 55/385.3 |
| 2273889 | 7/1994 | United Kingdom . |

*Primary Examiner*—Jay H. Woo
*Assistant Examiner*—Minh-Chau T. Pham
*Attorney, Agent, or Firm*—Hayes, Soloway, Hennessey, Grossman & Hage, P.C.

[57] ABSTRACT

A carburetor air intake velocity stack engagable with a carburetor inlet, has a cylindrical throat section having first and second ends. The first end is adapted to be coupled to the carburetor, while the second end is open to the air. A shaped, mesh filter having an effective open area which exceeds the open area of the velocity stack by at least about 50%, is located within said air intake velocity stack. The filter has a cylindrically formed flange member which is trapped between said air intake velocity stack and the carburetor.

11 Claims, 3 Drawing Sheets

VELOCITY STACK FILTER

BACKGROUND OF THE INVENTION

1. Field of the Invention

The present invention relates to air filters, and more particularly, to air filters for use in connection with air intake velocity stacks for use with internal combustion engines. The invention has particular utility in connection with air intake velocity stacks for motorcycle engines, and will be described in connection with such utility, although other utilities are contemplated.

2. Prior Art

The improvement of carbureting devices has led to a number of highly sophisticated and expensive pieces of equipment which basically have the objective to increase the efficiency of the air-fuel mixture being delivered to a vehicle engine. The classical method of increasing power was to increase the manifold throat size of the carburetor to increase the air flow and thereby increase the available power. It was thought that an increase in throat and carburetor valve sizes would produce a comparable increase in power at the engine output. One of the approaches to increase power without increasing displacement was to obtain a higher charge to the air-fuel mix in the engine chamber. Many of the devices disclosed by the prior art sought to increase the charge of the air-fuel mix by increasing the throat size, but this had an inherent problem. However, merely increasing the throat size resulted in a corresponding drop in air flow speed which produced incomplete fuel atomization because the air flow through the carburetor was too slow.

One of the methods of moving the desired volume of air-fuel mix into the chamber of the engine is to adapt the throat diameter and shape of the air intake velocity stack to provide for proper air flow into the carburetor. To this end, various air intake velocity stacks have been developed to provide a proper balance between the shape of the air intake stack and the size of the throat to achieve the desired volume of air-fuel mix at an adequate air flow. Referring to FIGS. 1 and 2, typical prior art air intake velocity stack 10 comprises a lower throat section 11 and an upper bell-like terminus 12. Throat 11 is a substantially cylindrical section which integrally extends into terminus 12. The outer surface of throat section 11 is flanged at 14, and includes bolt holes 15 which permit the velocity stack to be bolted to a carburetor 16. Carburetor 16 as shown in FIG. 1 employs a mounting plate 17, having bolt holes 18 being cooperatively aligned with bolt holes 15 in plate 14. Carburetor 16 is of the conventional type, and employs a fuel metering mechanism (not shown) which includes liquid fuel tube and fuel-metering needle, float, choke plate, and the necessary springs to provide a resilient force necessary to control the fuel metering system of carburetor 16. The actual construction and operation of carburetor 16 is beyond the scope of this application, the operation thereof being substantially similar to that described in U.S. Pat. No. 3,709,469.

Carburetor 16 is coupled to the vehicle engine through the use of engine mounting fixture 24. The internal throat 22 of mounting fixture 24 is substantially aligned with throat 11 of the air intake velocity stack 10 to provide a consistent flow path when the air throttling mechanism is opened.

Typically, air intake velocity stacks have been run open, i.e. without filters. However, running a velocity stack open, i.e. leading directly to the carburetor, invites particulate intake into the engine of contaminants such as sand, pebbles, etc. which could ruin an engine. A flat, clip-on filter mesh, designed to clip on the flanged open end of the stack, is available commercially. However, such clip-on mesh filters reduce the effective cross-sectional area of the velocity stack, and thus the air-fuel mixture, and also clog quickly, further degrading engine performance. Also, many motorcycle owners do not like to use clip-on filters because the clip-on mesh detracts from the appearance of the highly chromed velocity stack.

Some motorcycle owners stuff steel wool mesh or the like into the velocity stack, for catching sand and other particles. However, steel wool mesh does not make a good filter, and is prone to being dislodged or vibrated out. Also, sand and other particles may drop into the carburetor, when the mesh is removed for cleaning or replacement, and thus, damage the engine.

The present invention seeks to solve the aforesaid and other problems of the prior art, by providing an air filter which is fully concealed within the velocity stacks so as to not detract from the appearance of the velocity stack while, at the same time, providing an effective open area which significantly exceeds the cross-sectional open area of the velocity stack, so as not to affect or degrade performance. In a preferred embodiment of the invention, the air filter has an effective open area which exceeds the cross-sectional open area of the velocity stack by at least about 50%, preferably at least about 100–200% or greater.

It is thus an object of the present invention to provide a particular filter which may be used in connection with an air intake velocity stack, which overcomes the aforesaid and other disadvantages of the prior art.

Another object of the present invention is to provide a filter for an air intake velocity stack which maximizes airflow to the carburetor.

Yet another object of the present invention is to provide a filter for an air intake velocity stack which is inexpensive and simple to fabricate, and which may easily and safely be removed for cleaning and/or replacement.

BRIEF DESCRIPTION OF THE DRAWINGS

Other objects and advantages of the present invention will be apparent from the following detailed description, taken in connection with the drawings, in which like numerals depict like parts, and wherein.

DESCRIPTION OF THE PRESENTLY PREFERRED EMBODIMENTS

Figure 1:
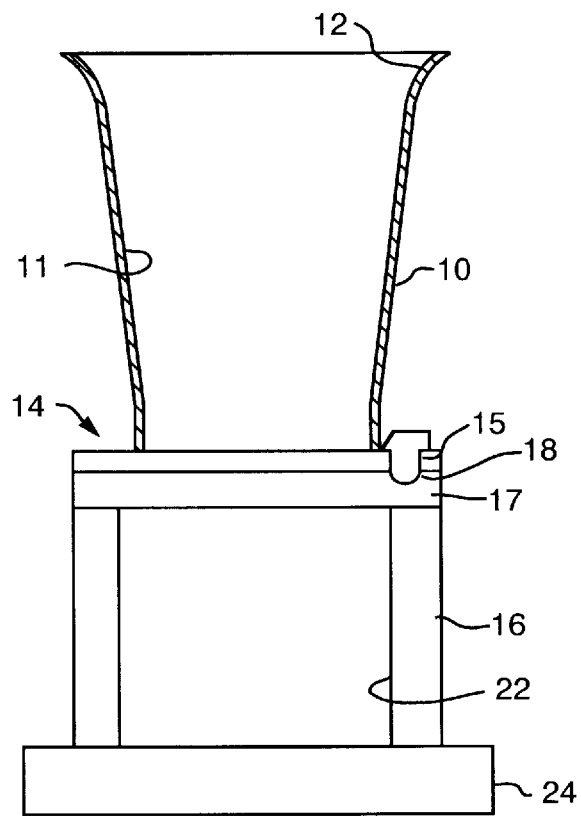
FIG. 1 is a cross-sectional view of a conventional air intake velocity stack mounted upon an exemplary carburetor and engine mount.
Figure 2:
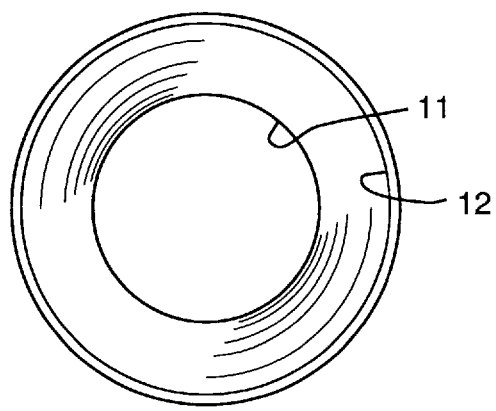
FIG. 2 is a top plan view of the air intake velocity stack of FIG. 1.
Figure 3:
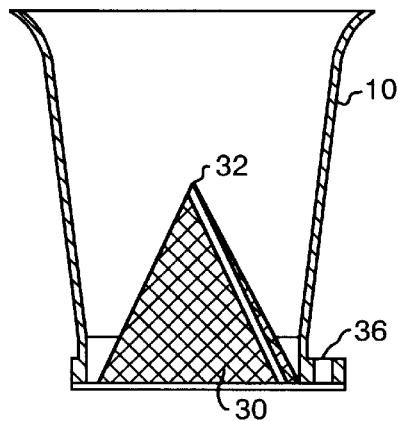
FIG. 3 is a cross-sectional view of an air intake velocity stack incorporating a filter made in accordance with the present invention.
Figure 4:
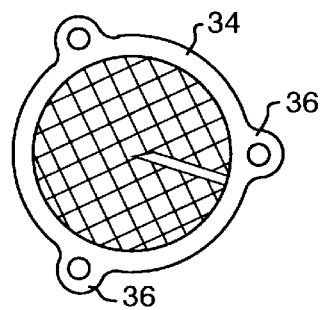
FIG. 4 is a top plan view of the air filter element of FIG. 3.

Referring to FIGS. 3 and 4, an air filter 30 made in accordance with the present invention comprises a perforated or woven metal screen (typically 0.01–0.10 inch open mesh size) formed into a cone, and having an apex 32 at one end, and affixed to a metal flange 34 at the base thereof. Flange 34 comprises a plurality of bolt holes 36 which are sized and positioned to locate and align with the bolt holes of mounting plate 14 of the velocity stack 10. Preferably flange 34 comprises a soft metal or metal/fiber laminate which forms a crushing seal when the velocity stack is bolted onto the carburetor.

A feature and advantage of the present invention immediately apparent is that in order to clean or change the air filter, the air intake velocity stack 10 and air filter are removed as a unit. Thus, there is no possibility that sand or other particulate matter could inadvertently be knocked off the filter and fall into the intake of the carburetor.

Figure 5:
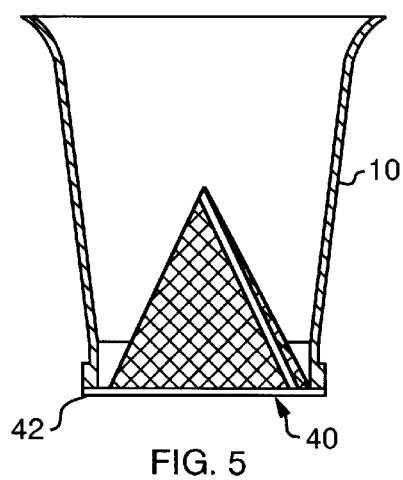
FIG. 5 is a view, similar to FIG. 3, and showing an alternative embodiment of air intake velocity stack filter made in accordance with the present invention.
Figure 6:
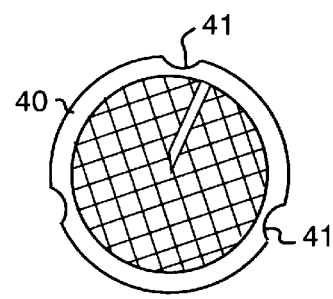
FIG. 6 is a top plan view of the air filter element of FIG. 5.

Referring to FIGS. 5 and 6, there is shown an alternative embodiment of air intake velocity stack/filter made in accordance with the present invention. In the embodiment shown in FIGS. 5 and 6, the filter 54 comprises an integral ring style seal 40 which seats in a circular groove 42 formed in the mounting plate 17 of the air intake velocity stack 10. As can be seen in FIG. 6, ring seal 40 may be notched at 41 to permit passage of the mounting bolts.

Figure 7:
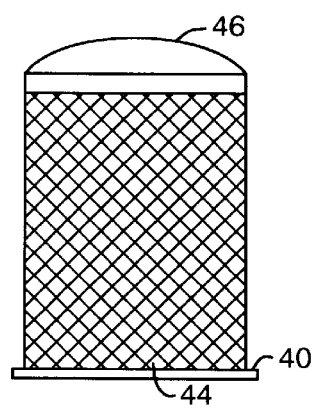
FIG. 7 is a side elevational view of an alternative embodiment of an air filter made in accordance with the present invention.
Figure 8:
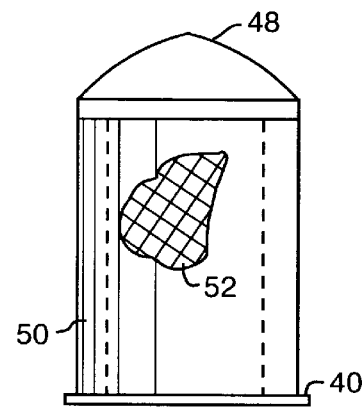
FIG. 8 is a side elevational view, in partial cross-section, and showing yet another embodiment of air filter element made in accordance with the present invention.

The filter element may assume other shapes. For example, as shown in FIG. 7, the filter element may comprise a cylindrically shaped metal screen element 44 which is affixed at its base to ring seal 40, and is affixed at its other end to a shaped dish nose 46 typically formed of stamped metal or the like. Alternatively, as shown in FIG. 8, the nose may be shaped to a sharper apex, i.e. thereby more of a laminar flow over the shaped surface 48. Also, in order to increase the filtering capacity and thus lengthen the intervals between filter changes, a corrugated paper filter element 50 may be wrapped around screen filter element 52. Alternatively, outer element 50 may comprise a second metal screen element, based from inner screen filter element 52.

Figure 9:
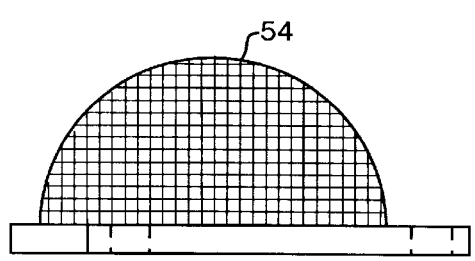
FIG. 9 is a view, similar to FIG. 3, and showing yet another alternative embodiment of air intake velocity stack filter made in accordance with the present invention.
Figure 10:
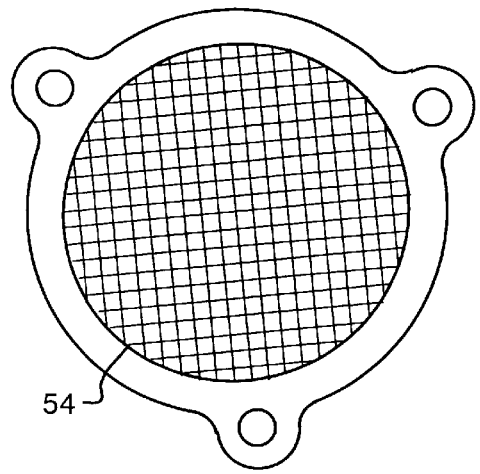
FIG. 10 is a top plan view of the air filter element of FIG. 9.

Referring to FIGS. 9 and 10, the filter element may comprise a semi-spherically shaped metal screen element 52.

Still other changes may be made without departing from the spirit and scope of the invention.

I claim:

1. A carburetor air intake velocity stack engagable with a carburetor inlet, and comprising, a cylindrical throat section having first and second ends, the first end thereof being coupled to the carburetor, the second end thereof being open to the atmosphere;

a shaped, mesh filter, located within said air intake velocity stack, said filter having a cylindrically formed flange member trapped between said air intake velocity stack and said carburetor, said filter having an effective open area which exceeds the cross-sectional open area of the velocity stack by at least about 50%; and a plurality of bolts for fixing said air intake velocity stack to said carburetor inlet.

2. An air intake velocity stack according to claim 1, wherein said filter screen is shaped as a cone.

3. An air intake velocity stack according to claim 1, wherein said filter is shaped as a cylinder, one end of which is affixed to said flange, and further including a shaped nose affixed to the other end of said cylinder.

4. An air intake velocity stack according to claim 3, wherein said filter comprises a first screen member, and a second screen member surrounding the first screen member, at least in part.

5. An air intake velocity stack according to claim 4, wherein said first screen member comprises a corrugated element.

6. An air intake velocity stack according to claim 5, wherein said corrugated element comprises corrugated paper or cloth.

7. An air intake velocity stack according to claim 1, wherein the filter has an effective open area which exceeds the cross-sectional open area of the velocity stack by at least about 100–200%.

8. An air intake velocity stack according to claim 1, wherein said flange includes a plurality of bolt holes which are sized and located to accommodate said bolts.

9. An air intake velocity stack according to claim 1, wherein said flange includes a plurality of notches which are sized and located to accommodate said bolts.

10. An air intake velocity stack according to claim 1, wherein said filter flange member comprises a soft metal which forms a crushing seal when the velocity stack is bolted onto said carburetor.

11. An air intake velocity stack according to claim 1, wherein said filter flange member comprises a metal/fiber laminate which forms a crushing seal when the velocity stack is bolted onto said carburetor.

* * * * *